(12) United States Patent
Files et al.

(10) Patent No.: US 11,736,809 B2
(45) Date of Patent: Aug. 22, 2023

(54) METHOD TO DYNAMICALLY ADJUST DISPLAY TO ENHANCE AMBIENT LIGHTING IN A VIDEO CONFERENCE AND SYSTEM THEREFOR

(71) Applicant: DELL PRODUCTS, LP, Round Rock, TX (US)

(72) Inventors: Jace W. Files, Round Rock, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 16/950,231

(22) Filed: Nov. 17, 2020

(65) Prior Publication Data

US 2022/0159166 A1    May 19, 2022

(51) Int. Cl.
*H04N 5/262* (2006.01)
*H04N 23/74* (2023.01)
*H04N 7/14* (2006.01)

(52) U.S. Cl.
CPC ........... *H04N 23/74* (2023.01); *H04N 5/2621* (2013.01); *H04N 7/142* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,028,690 | A * | 2/2000 | Carter | G02B 26/0841 |
| | | | | 359/224.1 |
| 8,331,566 | B1 * | 12/2012 | Foote | H04L 67/5651 |
| | | | | 380/255 |
| 9,015,241 | B2 | 4/2015 | Bedingfield, Sr. | |
| 9,635,255 | B1 * | 4/2017 | Baldwin | H04N 23/74 |
| 10,788,200 | B2 | 9/2020 | Abou-Fadel et al. | |
| 2011/0234612 | A1 * | 9/2011 | Wei | G09G 3/3426 |
| | | | | 345/589 |
| 2013/0050233 | A1 * | 2/2013 | Hirsch | G09G 5/02 |
| | | | | 345/589 |
| 2013/0334972 | A1 * | 12/2013 | Atkins | G02B 6/0036 |
| | | | | 315/151 |
| 2019/0303551 | A1 * | 10/2019 | Tussy | G06V 40/166 |
| 2020/0196471 | A1 * | 6/2020 | Wang | G06F 1/1656 |
| 2020/0201534 | A1 * | 6/2020 | Chen | G06F 3/0485 |

* cited by examiner

*Primary Examiner* — Duc Nguyen
*Assistant Examiner* — Assad Mohammed
(74) *Attorney, Agent, or Firm* — Larson Newman, LLP

(57) ABSTRACT

A method for adjusting illumination of a user operating an information handling system may include capturing an image of the user's face using a camera at the information handling system. The method may further include determining lighting characteristics of the user's face based on the captured image. A border to be displayed surrounding a video image can be generated based on the determined lighting characteristics. The video image and the border can be displayed at a display device.

18 Claims, 5 Drawing Sheets

METHOD TO DYNAMICALLY ADJUST DISPLAY TO ENHANCE AMBIENT LIGHTING IN A VIDEO CONFERENCE AND SYSTEM THEREFOR

FIELD OF THE DISCLOSURE

This disclosure generally relates to information handling systems, and more particularly relates to dynamically adjusting a display to enhance ambient lighting in a video conference.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method for adjusting illumination of a user operating an information handling system may include capturing an image of the user's face using a camera at the information handling system. The method may further include determining lighting characteristics of the user's face based on the captured image. A border to be displayed surrounding a video image can be generated based on the determined lighting characteristics. The video image and the border can be displayed at a display device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
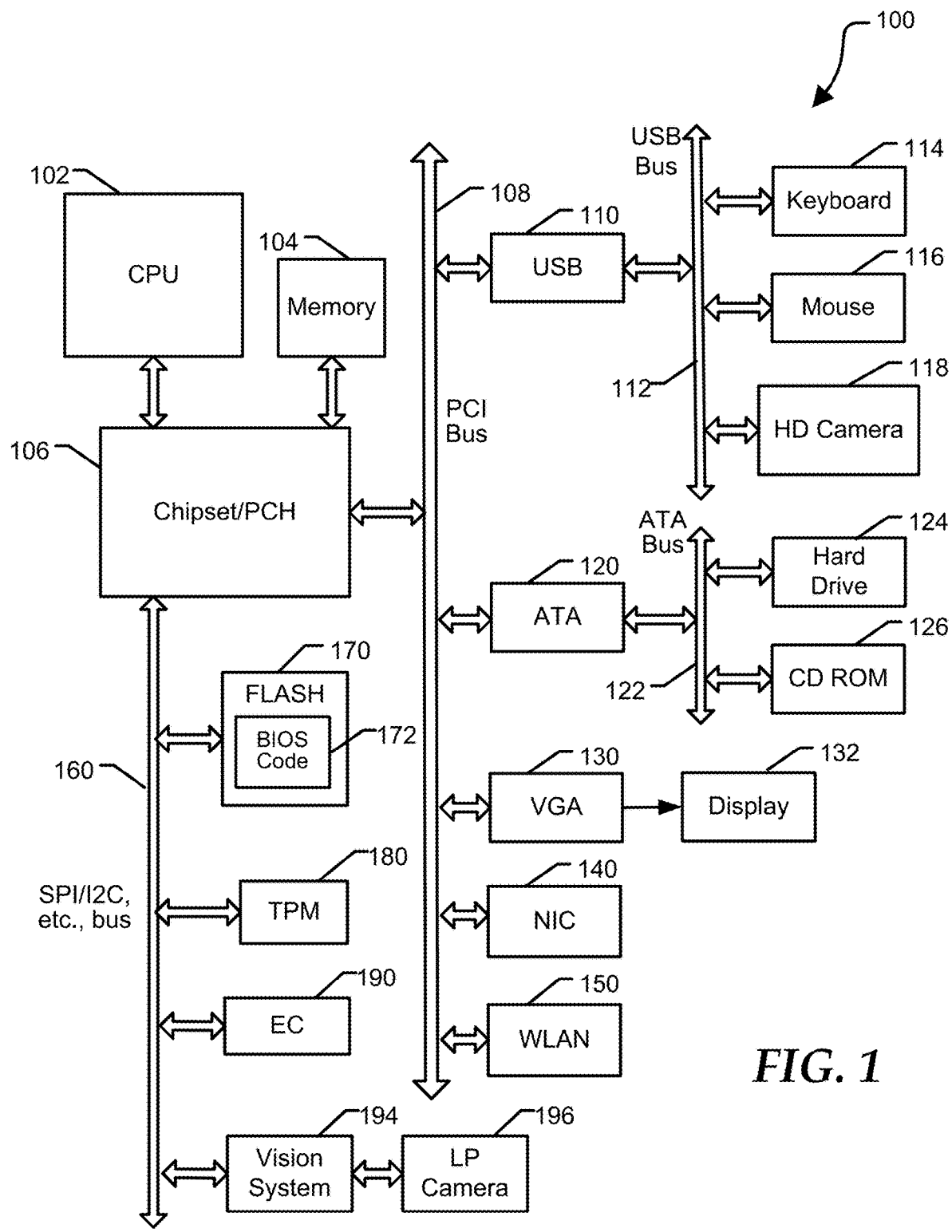
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, a high-definition (HD) camera 118, an ATA bus controller 120, an ATA bus 122, a data storage device 124, a compact disk read only memory (CD ROM) device 126, a video graphics array (VGA) device 130, a display device 132, a network interface controller (NIC) 140, a wireless local area network (WLAN) controller 150, one or more serial buses 160, a non-volatile rand access memory (NVRAM) 170 for storing a basic input/output system (BIOS) 172, a trusted platform module (TPM) 180, an embedded controller (EC) 190, a vision system 194, and a low power (LP) camera 196.

HD camera 118 can be configured to capture an image or video of a user operating information handling system 100. LP camera 196 typically captures a low resolution image relative to that provided by HD camera 118. For example, LP camera 196 may provide images having 320×240 pixels (QVGA) or another resolution. LP cameral 196 typically consumes a small fraction of the power required to operate an HD camera, for example a few mW or lower. Vision system 194 can be configured to analyze an image provided by LP camera 196. Vision system 194 may utilize machine-learning, similar artificial intelligence technology algorithms, or dedicated logic to identify presence and illumination characteristics of a user at information handling system 100. To maintain privacy and security, images captured by LP camera 196 can be provided only to vision system 194, thereby being inaccessible to other processes executing at system 100.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. After the initialization procedure is complete and an operating system, such as Windows, is loaded, computational operation of information handling system can begin. BIOS 172 can be substantially compliant with one or more revisions of the UEFI specification. The UEFI specification provides standard interfaces and interoperability guidelines for devices that together make up an information handling system. The UEFI specification allows for the extension of platform firmware by loading UEFI driver and UEFI application images. For example, an original equipment manufacturer can include customized or proprietary images to provide enhanced control and management of the information handling system 100.

Information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more buses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Figure 2:
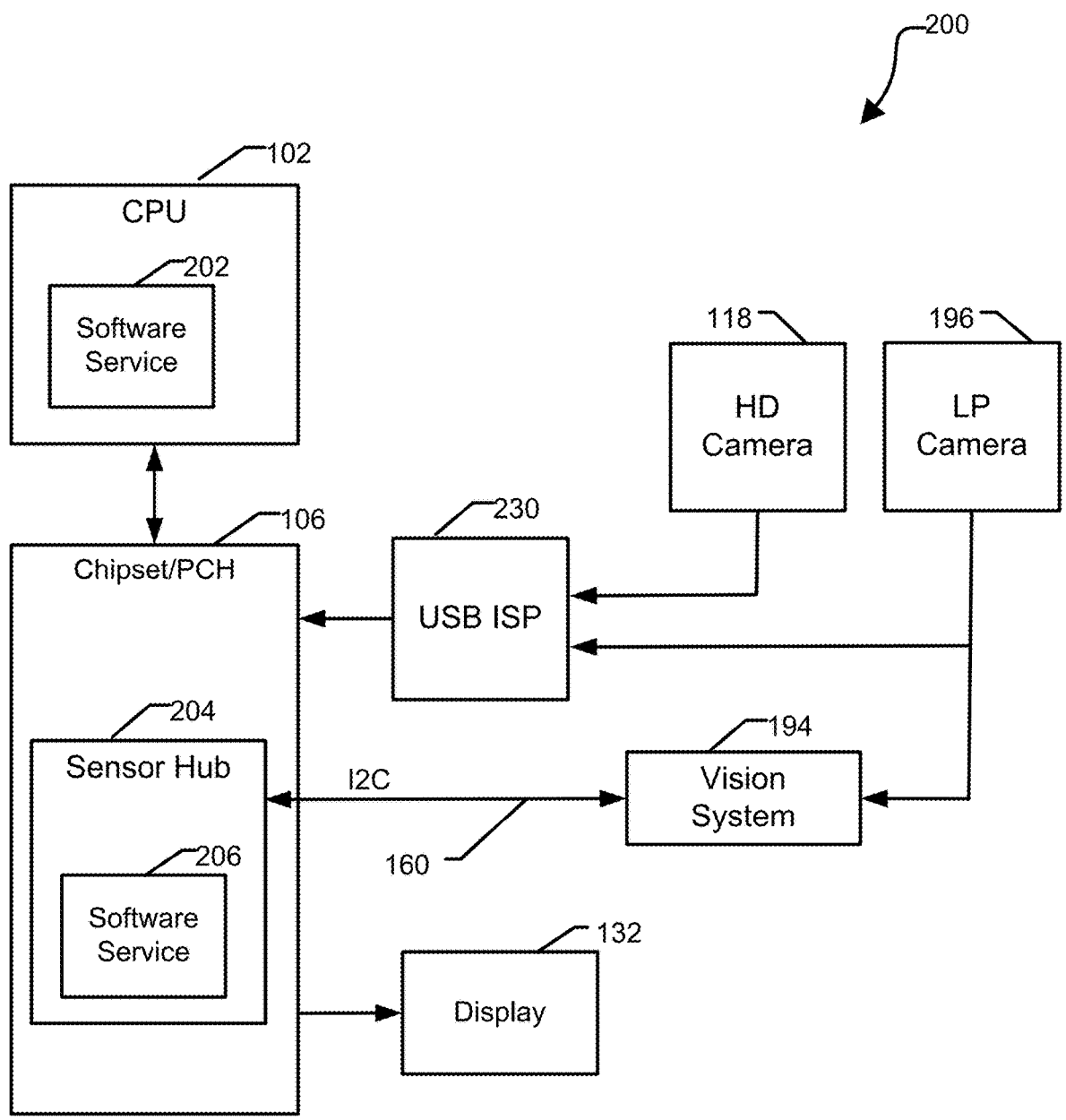
FIG. 2 is a block diagram illustrating a camera and image processing system according to a specific embodiment of the present disclosure.

FIG. 2 shows a camera and image processing system 200 according to a specific embodiment of the present disclosure. System 200 includes CPU 102, chipset 106, HD camera 118, LP camera 196, a USB image signal processor (ISP) 230, vision system 194, and display 132. Display 132 can be coupled to a VGA controller included at chipset 106 or can be coupled to a discrete graphics processing unit (GPU), typically coupled to system 100 via PCI interface 108. CPU 102 can be configured to execute a software service 202 in addition to other system and software applications. Chipset 106 includes a sensor hub 204. Sensor hub 204 includes a microcontroller (not shown at FIG. 2) that is configured to execute a software service 206. USB ISP 230 is configured to process images received from HD camera 118 and optionally images received from LP camera 196, and provide video to chipset 106 via a USB interface. Vision system 194 can be configured to receive an image from LP camera 196, analyze the image, and provide information identifying presence and facial lighting of a user operating information handling system 100 to sensor hub 204 via I2C bus 160. Software service 202 is configured to execute at CPU 102 during runtime while information handling system 100 is under the control of an operating system. Software service 202 can be configured to analyze images generated by either HD camera 118 or LP camera 196 to provide information identifying presence of a user and information identifying facial illumination of the user. Software service 206 can execute at sensor hub 204 independent of the operating/sleep state of system 100.

Figure 3:
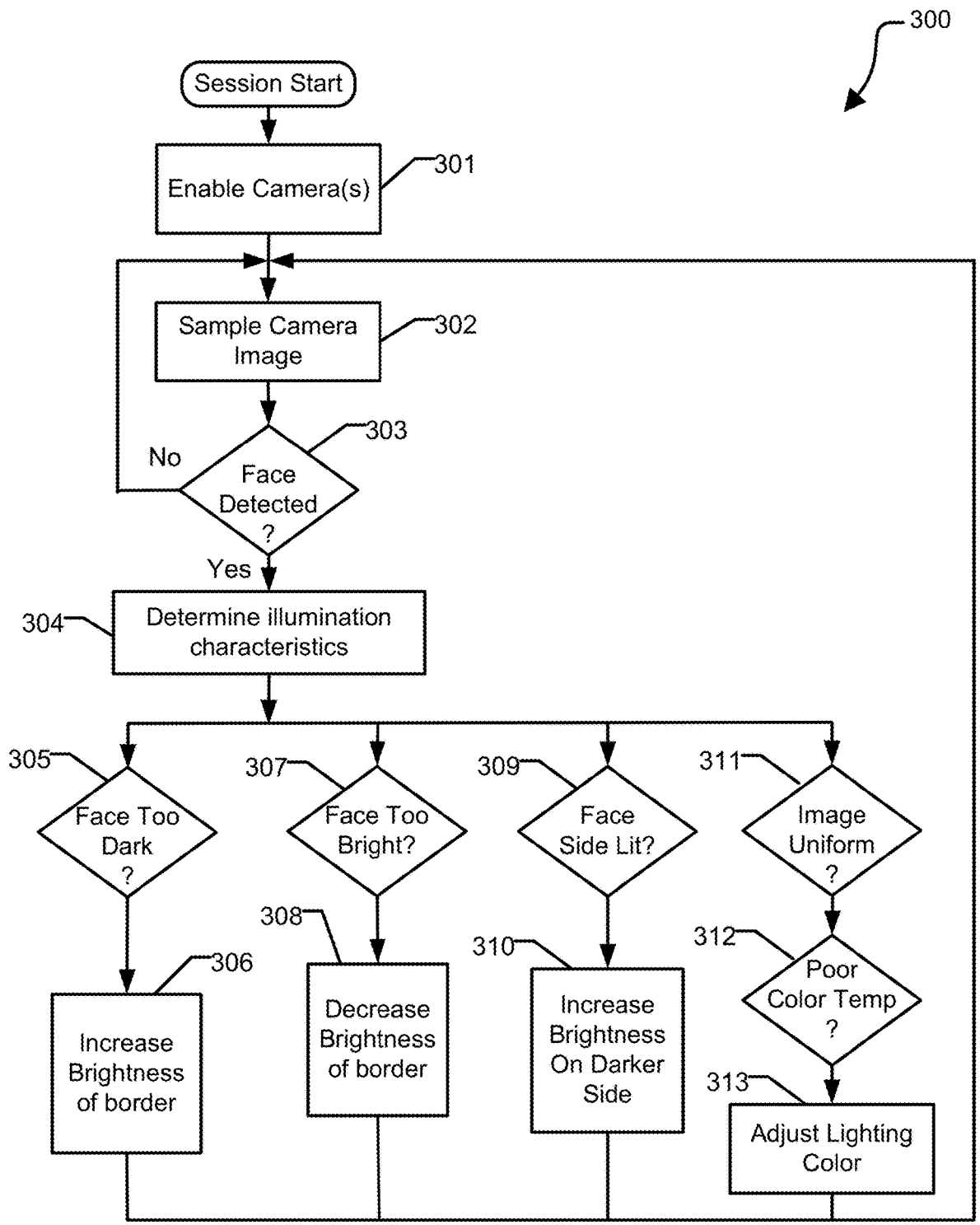
FIG. 3 is a flow diagram illustrating a method for adjusting ambient lighting based on analysis of a camera image according to a specific embodiment of the present disclosure.

FIG. 3 shows a method 300 for adjusting ambient lighting based on analysis of a camera image according to a specific embodiment of the present disclosure. In particular, images received from HD camera 118 or from LP camera 196 can be analyzed by software service 206 or software service 202 to determine whether a user's face is satisfactorily illuminated, partially shadowed, too bright or too dark, has a desired color tone, and the like. The techniques disclosed herein are especially well suited for use in a video conference scenario, but can be used any time a video recording of a user operating information handling system is underway. Depending on how the user's face is illuminated, remediation can be employed to improve the ambient lighting on the user's face. For example, in a video conference application, a border surrounding the video conference application image can be generated, the lighting characteristics of the border adjusted by software service 202 or 206 to provide ambient light to improve illumination of the user's face. Method 300 can be implemented by software service 202, 206, or another software application. For the present example, method 300 is described in the context of a video conference where a conference application provides an image on the user's display, such as an image of one or more other participants in the video conference.

Method 300 begins at block 301 where one or more cameras are enabled, such as HD camera 118 or LP camera 196. At block 302, an image is captured. At decision block 303, the captured image is analyzed to determine whether a user is present, and in particular whether the face of the user is detected. If a user's face is not detected, method 300 returns to block 302 where another images can be captured. If a user's face is detected, method 300 proceeds to block 304 where the image of the user's face is analyzed to determine specific characteristics of illumination of the user's face. For example, software service 202 or 206 can analyze the captured image to determine whether the user's face is excessively bright, too dark, side lit resulting in shadowing on a portion of the user's face, or whether the user's face is uniformly illuminated.

Figure 4A:
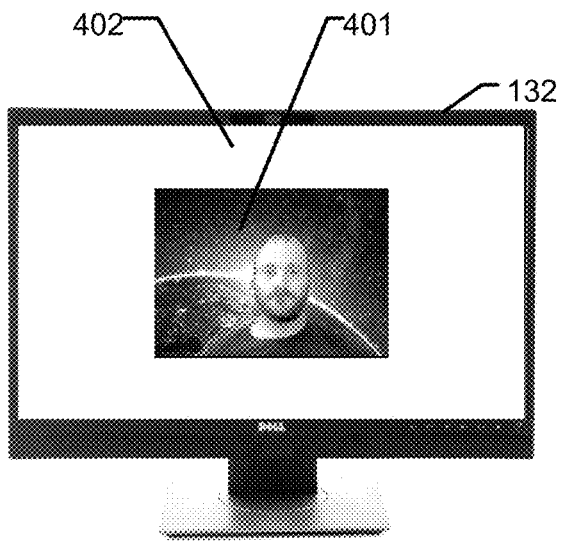
FIG. 4A is a diagram illustrating adjustment of ambient lighting according to a specific embodiment of the present disclosure.
Figure 4B:
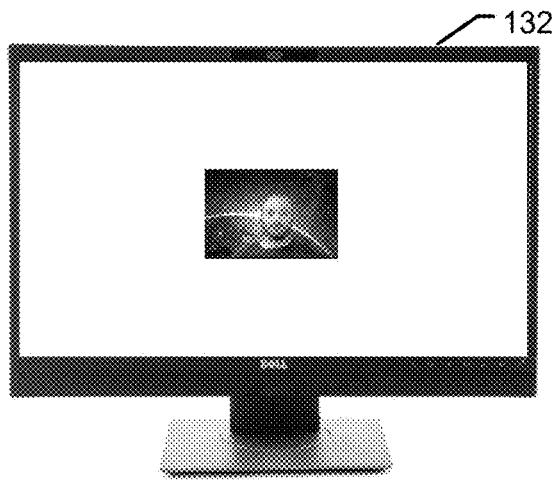
FIG. 4B is a diagram illustrating adjustment of ambient lighting according to another embodiment of the present disclosure.
Figure 4C:
FIG. 4C is a diagram illustrating adjustment of ambient lighting according to yet another embodiment of the present disclosure.

If the captured image shows that the user's face is too dark or excessively back-lit, method 300 proceeds from decision block 305 to block 306, where a border surrounding the video conference image is brightened. The border can be brightened by increasing the luminosity of pixels included at the border, as shown at FIG. 4A, increasing the size of the border relative to the video conference image, as shown at FIG. 4B, or both. FIGS. 4A-4D show display 132, an application image 401, and a border 402. Light from border 402 provides ambient illumination, thereby improving the lighting of the user's face seen by other participants in the video conference. If the captured image shows that the user's face is too bright, method 300 proceeds from decision block 307 to block 308 where border 402 surrounding the video conference image is darkened, as shown at FIG. 4C. Luminosity of the border can range from black to white and all gray-tones in-between. In addition to luminosity, the color of the border can be selected, as described below, to adjust the color temperature of the ambient light provided by border 402.

Figure 4D:
FIG. 4D is a diagram illustrating adjustment of ambient lighting according to still another embodiment of the present disclosure.

If the captured image shows that the user's face is unevenly illuminated, method 300 proceeds from decision block 309 to block 310 where luminosity of the portions of the generated border are adjusted to reduce shadows or reduce excessive highlights. FIG. 4D illustrates a situation where the left side of the user's face is excessively bright while the right side of the user face is partially shadowed. To provide more uniform illumination of the user, the left side of the border can be darkened while the right side of the border can be brightened. FIG. 4A illustrates an extreme contrast between the left and right sides, but one of skill will appreciate that luminosity of particular portions of the border can be adjusted over a continuous range from black to gray to white. Furthermore, the transition of illumination across areas of the border can be gradual. For example, luminosity of the border can transition from black or darker gray on the left side to white or lighter gray on the right side. If the other side of the user's face is shadowed, the luminosity variation of the border can be reversed.

If the captured image shows that the user's face is evenly illuminated, method 300 proceeds from decision block 311 to decision block 312 where the image is analyzed to determine whether the color temperature of the user's image is acceptable. For example, ambient light in the user's environment may be excessively tinted orange or blue. If the color temperature is not ideal, such as determined by comparing the color temperature of the image to a predetermined ideal temperature, the method proceeds to block 313 where the color of all or a portion of the border can be adjusted to better illuminate the user's face. For example, if the user's face is too orange, the border can set to a blue color, and if the user face is too blue, the border can be set to an orange color. After adjusting the border as described above, method 300 returns to block 302 where another image is captured and analyzed. Accordingly, method 300 can periodically reevaluate illumination of the user's face and dynamically adjust characteristics of the border to improve illumination of the user's face.

In an embodiment, luminosity and color of the border can be adjusted based on a calibration image accessible to the software service. Since lighting and color tone is subjective, providing a calibration image as a reference provides the border generation algorithm implemented by software service 202 or 206 with a reference to target, the algorithm adjusting the lighting and color temperature of the border to attempt to match the calibration image. In another embodiment, luminosity and color of the border can be further adjusted based on preferences provided by the user or by standards specified by the video conference application. In another embodiment, software service 202 or 206 can control lighting external to display 132 in order to optimize lighting of the user operating information handling system 100.

Figure 5:
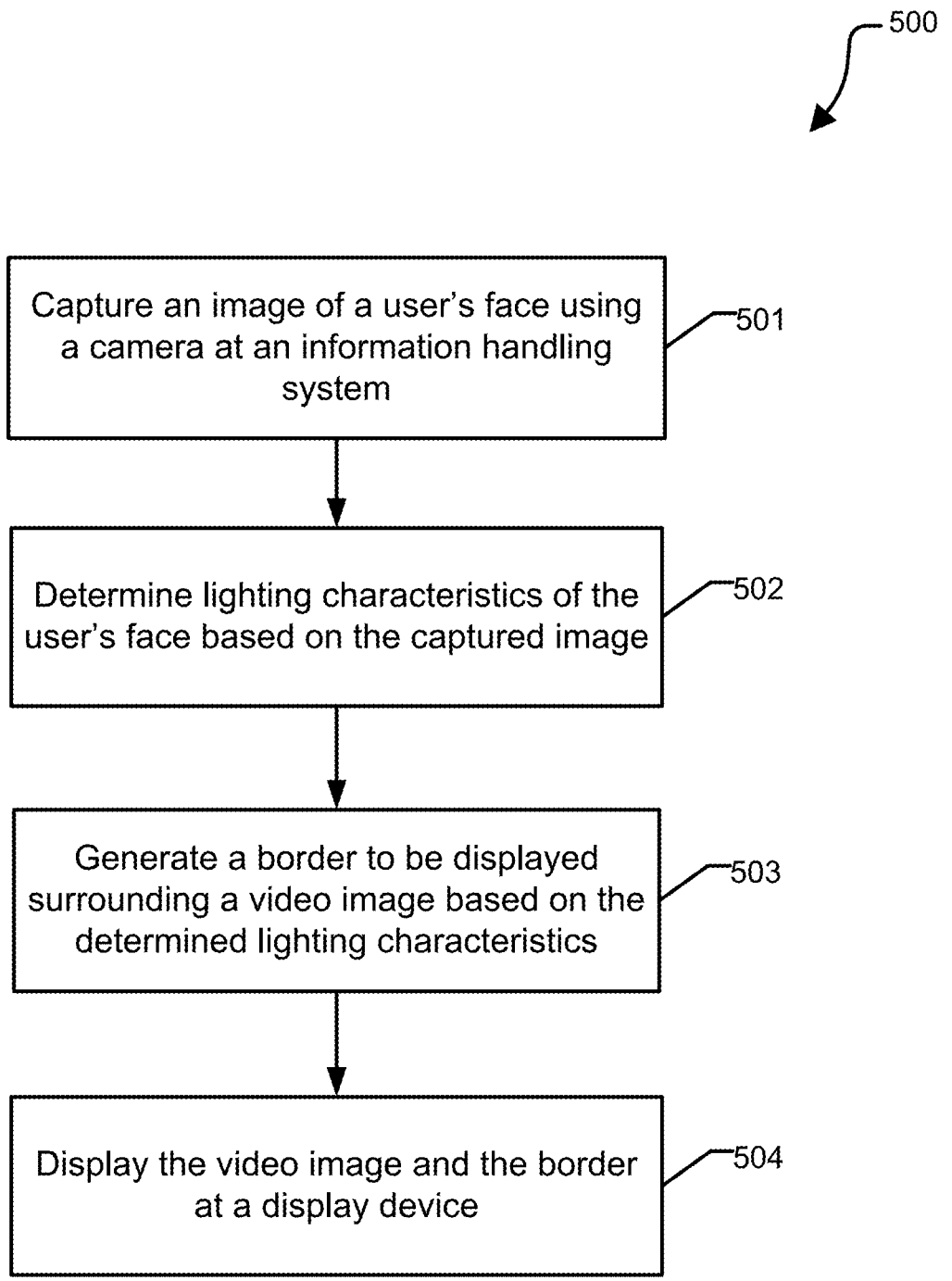
FIG. 5 is a flow diagram illustrating a method for adjusting ambient lighting according to a specific embodiment of the present disclosure.

FIG. 5 shows a method 500 for adjusting ambient lighting according to a specific embodiment of the present disclosure. Method 500 begins at block 501 where an image of a user's face is captured using a camera included at an information handling system. At block 502, lighting characteristics of the user's face is determined based on the captured image. For example, software services 202 or 206 can analyze the captured image to determine whether the user is uniformly illuminated, as described above. At block 503, a border is generated to be displayed surrounding a video image, luminosity and color of the border selected based on the determined lighting characteristics. Method 500 completes at block 504 where the video image and the border are displayed at a display device.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a display device;
   first and second cameras; and
   a software process to:
      configure the first camera to capture an image of a user of the information handling system;
      determine lighting characteristics of the user's face based on the captured image from the first camera;
      generate a border to be displayed surrounding a video image based on the determining, the border to adjust illumination of the user's face, wherein the video image is captured by the second camera, wherein the generated border includes a transition of illumination across areas of the generated border is gradual and in a continuous range from black on a first side of the generated border to gray to white on a second side of the generated border; and
      display the video image and the generated border at the display device.

2. The information handling system of claim 1, wherein in response to determining that the user's face is darker than a predetermined threshold, increasing brightness of the border.

3. The information handling system of claim 1, wherein in response to determining that the user's face is brighter than a predetermined threshold, decreasing brightness of the border.

4. The information handling system of claim 1, wherein in response to determining that a first side of the user's face is darker than the opposite side of the user's face, increasing brightness of the border on the first side relative to the opposite side of the border.

5. The information handling system of claim 1, wherein the software service is further to adjust the size of the video image relative to the size of the border based on the determining.

6. The information handling system of claim 1, wherein the software process is further to:
   determine a color temperature of the user's face based on the captured image; and
   adjust a color of the border based on the determined color temperature.

7. The information handling system of claim 1, wherein the first camera is a high-definition camera.

8. The information handling system of claim 1, wherein the second camera providing a higher definition image relative to the first camera.

9. A method for adjusting illumination of a user operating an information handling system, the method comprising:
- capturing an image of the user's face using a first camera at the information handling system;
- determining lighting characteristics of the user's face based on the captured image from the first image;
- generating a border to be displayed surrounding a video image based on the lighting characteristics, wherein the video image is captured by the second camera, wherein the generated border includes a transition of illumination across areas of the generated border is gradual and in a continuous range from black on a first side of the generated border to gray to white on a second side of the generated border; and
- displaying the video image and the generated border at a display device at the information handling system.

10. The method of claim 9, wherein in response to determining that the user's face is darker than a predetermined threshold, increasing brightness of the border.

11. The method of claim 9, wherein in response to determining that the user's face is brighter than a predetermined threshold, decreasing brightness of the border.

12. The method of claim 9, wherein in response to determining that a first side of the user's face is darker than the opposite side of the user's face, increasing brightness of the border on the first side relative to the opposite side of the border.

13. The method of claim 9, further comprising adjusting the size of the video image relative to the size of the border based on the determining.

14. The method of claim 9, further comprising:
- determining a color temperature of the user's face based on the captured image; and
- adjusting a color of the border based on the determined color temperature.

15. The method of claim 9, wherein the first camera is a high-definition camera.

16. The method of claim 9, wherein a resolution of the first camera is less than that of the second camera included at the information handling system, the second camera providing a high-definition image.

17. The method of claim 9, wherein luminosity of the generated border varies continuously from one side of the display to the opposite side of the display.

18. An information handling system comprising:
- a display device;
- first and second cameras; and
- a processor to execute instructions to implement a video conference client, the instructions to:
  - configure the first camera to capture an image of a user attending the video conference;
  - determine lighting characteristics of the user's face based on the captured image from the first camera;
  - generate a border to be displayed surrounding a video conference image, the border to adjust illumination of the user's face based on the determined lighting characteristics, wherein the video conference image is captured by the second camera, wherein the generated border includes a transition of illumination across areas of the generated border is gradual and in a continuous range from black on a first side of the generated border to gray to white on a second side of the generated border; and
  - display the video conference image and the generated border.

* * * * *